United States Patent Office 3,351,898
Patented Nov. 7, 1967

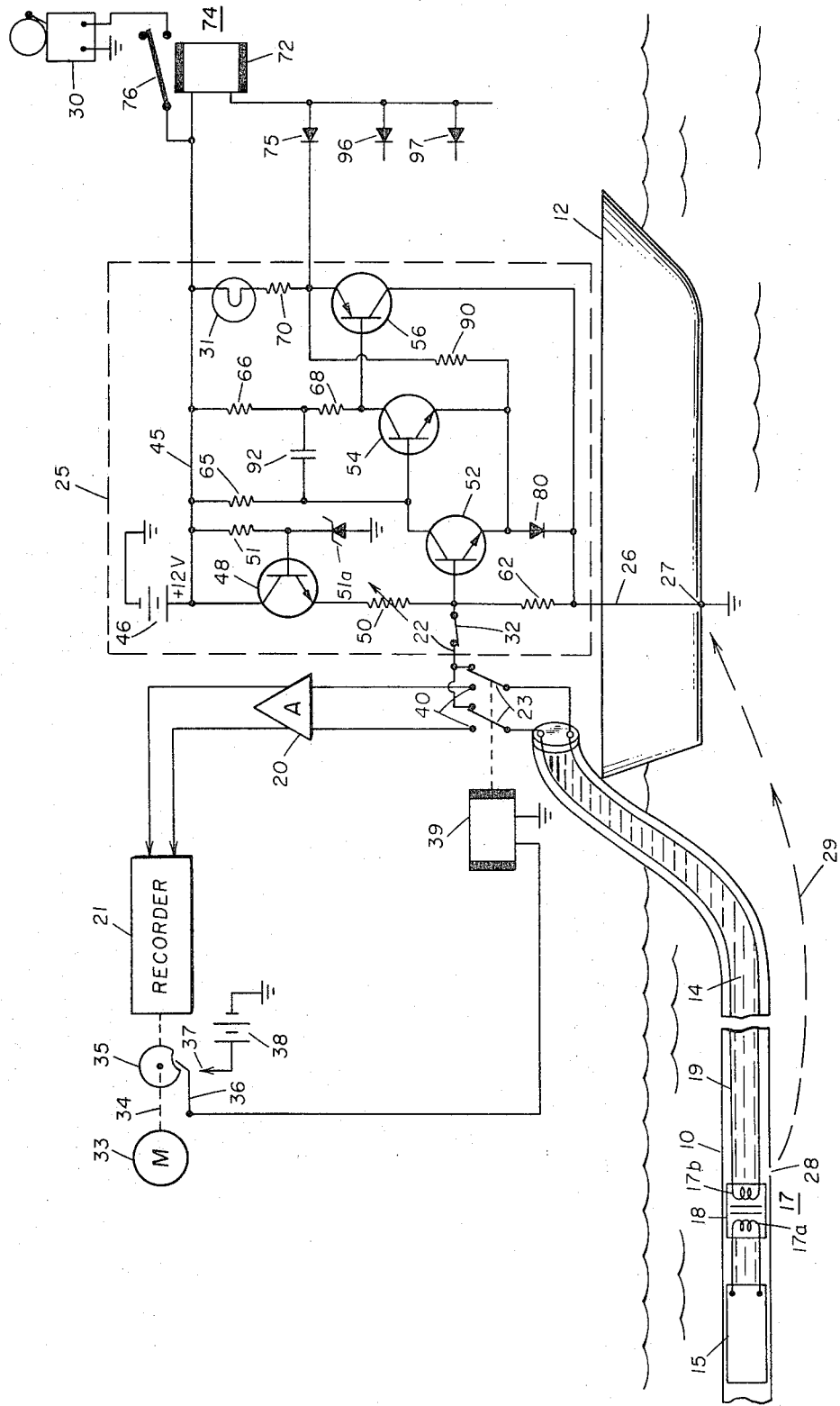

3,351,898
METHOD AND APPARATUS FOR MONITORING THE CONDITION OF A MARINE SEISMIC DETECTOR CABLE
Francis M. Romberg, Irving, Tex., assignor to Mobil Oil Corporation, a corporation of New York
Filed May 27, 1966, Ser. No. 553,363
14 Claims. (Cl. 340—7)

ABSTRACT OF THE DISCLOSURE

This specification discloses a method and apparatus for monitoring the condition of a marine seismic cable being towed behind a boat to give an alarm signal before extensive ripping or tearing occurs when the cable is caught on a underwater object. A voltage is applied between the conductors within the cable for each detecting channel and the hull of the boat. The conductors form one electrode and the hull of the boat forms the other electrode of a current leakage detector. When a break occurs in the outer sheath of the detector cable to admit salt water, a current leakage path is created between the point on the conductors touched by the salt water and the hull of the boat. An indicator device provides an alarm signal when the current leakage exceeds a predetermined threshold level.

Background of the invention

This invention relates to marine seismic exploration and, more particularly, to a method and apparatus for determining the tearing of a marine seismic cable by sensing changes in impedance between the conductors of the marine cable and the salt water.

The older types of seismic cables used in the marine exploration industry were of sturdy construction and short length, on the order of a thousand feet. These old cables were towed behind a recording boat at a level in the water where the operators on board the boat could easily watch the cables and notice when the cables were caught on any obstructions in the water. The old cables usually included heavy stress members and rigid connections between the sections of the cables so that they were relatively invulnerable to being scraped or torn. If the old cables became hung on an underwater obstruction, the tension in the cable could be felt on board the boat. The operators on the boat could easily stop the boat and disentangle the cable before damage occurred.

Recently the exploration industry has begun to use cables of very delicate construction and relatively long length, on the order of one mile. Most of these new cables are designed to be streamlined in the water and are encased in a thin, flexible sheath that is vulnerable to ripping or tearing when the cable is caught on an obstruction in the water. The new cables are usually filled with a fluid, such as kerosene, to make them the same density as the water so that they may ride below the surface of the water. Typically, the new cables are towed behind the recording boat at about 30 feet below the surface.

Sometimes when these new, streamlined and delicate cables are being towed by the recording boats at depths below the surface, they get caught on underwater obstructions, such as water buoys, drilling rigs, docks, fishing nets, and the like, without the operators on board the boat even knowing that such has happened. In at least one case in the exploration industry, a light, buoyant cable being towed by a seismic recording boat was caught on an underwater obstruction and a long length of the cable was stripped off while the boat was moving ahead before the operators realized the situation and stopped the boat.

Summary of the invention

In accordance with the present invention, there is provided a method of detecting the ripping or tearing of a marine seismic cable which is being towed by a boat and which includes electrical conductors. The method includes applying a voltage between at least one of the conductors and a grounding point in the water and then sensing the electric current flowing from the conductors via the water to the grounding point. When the sensed electric current exceeds a predetermined threshold level, there is provided an alarm indication of the ripping or tearing of the cable.

This invention also provides novel apparatus for carrying out the foregoing method. The apparatus can be used in a conventional marine seismic exploration system wherein energy is repetitively generated in the water and the resulting seismic waves are detected at at least one detector station located along a cable being towed by a boat. The detector station is connected by way of electrical conductors in the cable to equipment on board the boat for recording the detected seismic waves. The apparatus includes a detector circuit having an input terminal for connection to at least one of the conductors of the cable and a ground terminal for connection to a grounding point on the hull of the boat. The detector circuit includes a first resistor connected across the input and ground terminals, a source of regulated direct current voltage, and a second resistor having one end connected to the input terminal and the other end connected to the source of regulated voltage. The detector circuit also includes circuitry coupled to the input terminal and to the grounding terminal for producing an alarm signal at an output termial when sufficient leakage current flows from the conductors via the water to the grounding terminal to cause a decrease in voltage across the first resistor below a predetermined minimum level. A relay controlled switch under operational control of the recording equipment on board the boat disconnects the input terminal of the detector circuit from the conductors during the time of recording seismic waves. An alarm indicating means is connected to the output terminal of the detector circuit and is responsive to the alarm signal for giving an alarm indication to the operators on board the boat before extensive ripping or tearing occurs in the cable. As soon as the pilot of the boat senses the alarm, he may stop the boat immediately to prevent further tearing of the seismic cable.

Brief description of the drawing

For a better understanding of the invention, refer now to the following detailed description and accompanying drawing which illustrates a preferred embodiment of the invention showing a diagrammatic representation of a marine seismic cable being towed by a recording boat and a circuit schematic of the detector circuit on board the recording boat.

Description of the preferred embodiment

Referring now to the drawing, there is illustrated a marine seismic cable 10 which is being towed through the water by a recording boat 12. The cable 10 is shown diagrammatically in cross section to illustrate the kerosene 14 sealed inside the cable 10 to provide neutral buoyancy for the cable. In actual practice, the seismic cable 10 will be maintained at a selected level in the water by flotation equipment, and the cable will be wound on a reel located at the stern of boat 12. This reel and flotation equipment is not illustrated for simplicity in understanding the present invention. The rip-detecting circuit for only a single channel of the recording cable 10 will be described in the following. Of course, the cable 10 actually includes a plurality of detecting stations or channels distributed along the cable, and the conductors for each detecting station pass within the cable to a similar detecting circuit.

The single detecting channel illustrated includes a conventional crystal detector 15 connected to the primary 17a of an impedance-matching transformer 17. Transformer 17 is enclosed in a sealed case 18, but the terminals of secondary 17b are without insulation and exposed to the fluid 14. The secondary 17b is connected via the insulated conductors 19 running along the length of cable 10 to the recording equipment located in an instrument package on board the boat 12. The recording equipment includes an amplifier 20, the output of which is connected to a seismic recorder 21.

The input terminal 22 of an impedance-responsive detector circuit 25 is connected by way of switch armatures 23 to the conductors 19. A grounding terminal 26 of the circuit 25 is connected to a grounding point 27 on the hull of boat 12. A source of regulated voltage in the circuit 25 applies a low voltage via the input terminal 22 to the conductors 19.

If a break occurs in the sheath of cable 10, for example, at a rip 28, salt water diffuses into the fluid 14 and comes in contact with the terminals of the secondary 17b. There is then created a low impedance path between the terminals 17b and the sea water to the grounding point 27 on the hull of the boat. A leakage current flows along the path 29. As soon as the leakage current flowing along path 29 rises above a threshold level, the circuit 25 senses the current and causes the ringing of an alarm bell 30. Also, a pilot light 31 is energized to indicate to the operator which detecting channel of the recording cable 10 has the rip. An operator may disable the circuit 25 to stop the ringing of alarm 30 by opening switch 32.

Ordinarily, small salt water leakage in the cable 10 will short out the terminals of secondary 17b to cause a leakage current path 29 that is detected by the circuit 25. However, if the sheath of cable 10 is scraped off by an underwater obstruction and the insulation of conductors 19 are scraped to bare the conductors 19 to the salt water, there will be a leakage path created from the bared conductors via the salt water to the hull of the boat. Also, whenever the tension created by an underwater obstruction causes the cable 10 to snap, the bared ends of the conductors 19 will be exposed to the salt water to cause a leakage current.

When the recording boat 12 is in operation in an exploration system, seismic energy is generated at a point not illustrated and the resulting seismic waves which are reflected from subsurface horizons are detected at the detectors along the cable 10. The generation of the seismic energy is conventionally coordinated with the operation of the seismic recorder 21. A motor 33 drives recorder 21 by way of mechanical linkage 34 during the recording period following the generation of seismic energy.

In accordance with this invention, relay means is provided for connecting and disconnecting the detector circuit 25 from conductors 19 under operational control of the recorder 21. More specifically, a cam 35 is mounted for rotation on the linkage 34. Cam 35 includes a detent into which fits the switch armature 36 in the cam's normal position when seismic waves are not being recorded and the motor 33 is not operating recorder 21. However, at a time synchronized with the generation of seismic energy, motor 33 begins driving recorder 21 and cam 35 begins rotation. Thereupon the switch armature 36 comes out of contact with the detent onto the smooth periphery of cam 35 to force the armature 36 in contact with contact 37 throughout the period of recording seismic waves. With switch armature 36 closed to contact 37, there is completed a circuit from the direct current supply 38 through the switch armature 36 to energize the relay coil 39. Upon energization of relay coil 39, the relay armature 23 is closed to contacts 40 so that the conductors 19 are disconnected from the input terminal 22 and connected to the input of amplifier 20.

Following the period of recording seismic waves, the cam 35 rotates to its normal position where the switch armature 36 falls into the detent on cam 35, resulting in the de-energization of relay coil 39. The conductors 19 are then once again connected to the input of the detector circuit 25.

The impedance-responsive detector circuit 25 is supplied with bias voltage along bus 45 from the +12 volt batteries 46 in the electrical system of the boat. However, since the voltage of batteries 46 is subject to wide fluctuation, especially during the time when the boat's generators are charging batteries 46, they cannot be used effectively as a source of voltage to be applied to the conductors 19.

Therefore, in accordance with the present invention, a source of regulated direct current voltage is provided to apply a constant voltage to conductors 19. The regulated voltage is supplied by a transistor 48 whose emitter is connected through a variable resistor 50 to the input terminal 22. The collector of transistor 48 is connected directly to the +12 volt supply bus 45. Bias voltage for the transistor 48 is obtained through a resistor 51 connected from the supply bus 45 to the base of transistor 48. A Zener diode 51a is connected from the base of transistor 48 to ground to provide a constant voltage at this base. With a constant voltage on the base of transistor 48, the transistor draws current to maintain a constant voltage at its emitter. Therefore, there is a constant voltage from the upper end of resistor 50 to ground. In one embodiment of the invention a voltage of 11.5 volts was maintained at the upper end of resistor 50.

The current sensing circuit in detector circuit 25 comprises a first stage including transistor 52, a second stage including a transistor 54 connected in cascade, and an impedance-matching output stage including transistor 56. Transistor 52 is normally maintained in saturated condition by the biasing network including the variable resistor 50 connected to the constant voltage appearing at the emitter of transistor 48 and a resistor 62 connected from the base to the grounding point 27. When the transistor 52 is saturated, transistor 54 is turned off or cut off. Transistor 56 is maintained at cut-off by the positive voltage appearing at its base applied through resistors 66 and 68 from the positive voltage bus 45. While transistor 56 is cut off, its emitter is at a high positive voltage very close to the +12 volts on bus 45. Therefore, little or no current flows through the circuit including the pilot lamp 31 and resistor 70.

Whenever a leakage path occurs from the conductors 19 to the grounding point 27, the voltage applied to the base of transistor 52 drops. In effect, the impedance between the base of transistor 52 and the grounding point 27 is placed in parallel with the resistor 62 so that there is a low impedance between the base of transistor 52 and ground. As transistor 52 comes out of saturation and the voltage at its collector begins to rise, the transistor 54 is biased positively by the voltage from bus 45 so that the transistor 54 is turned on. When the transistor 54 is turned on, its collector is at a low positive voltage so that the emitter follower transistor 56 is turned on and current flows from the positive voltage bus 45 through lamp 31 to light the lamp and indicate an alarm. Also, when the transistor 56 is turned on, current flows from the positive voltage bus 45 through the coil 72 of a relay 74 and thence through the diode 75 through transistor 56 and to ground at 27. When the coil 72 is energized, the relay armature 76 is pulled to its lowermost position to apply the positive voltage from the bus 45 to the alarm bell 30 and cause the ringing of an alarm.

In accordance with the present invention, the detector circuit 25 is provided with a threshold sensitivity above which the ringing of the alarm 30 will occur. It has been found by experiment that certain voltages may be induced in the circuit between the base of transistor 52 and the grounding point 27 by the electrolytic action of dissimilar metals, such as copper and the iron hull of the boat, in electrolysis with the salt water. To render the detector circuit 25 insensitive to these induced voltages, a diode 80 is provided in the emitter circuit of transistor 52. The presence of diode 80 raises the potential at which transistor 52 is turned off.

A small positive voltage, on the order of 0.6 volt, is maintained across the diode 80 at all times. To maintain approximately constant current through the diode 80, and thus a constant voltage across the diode, a current path is provided by a resistor 90 connected between the anode of diode 80 and the emitter of transistor 56. When the transistor 54 is saturated, a current flows from the positive voltage bus 45 through transistor 54 and the diode 80. Now when the transistor 54 is cut off, a similar amount of current may flow from the bus 45 through the resistor 90 and the diode 80.

The circuit 25 may be calibrated to be responsive to a selected level of leakage current by adjustment of the variable resistor 50.

A capacitor 92 is provided between the collector of transistor 52 and the juncture between resistors 66 and 68 to filter out voltage spikes appearing at the input terminal 22 and to render the circuit 25 generally responsive to only low frequency signals.

The remaining recording channels in the cable 10 have similar impedance-responsive circuits to that of circuit 25 connected to the coil 72 of relay 74 by way of diodes 96 and 97. The diodes 75, 96, and 97 are provided to prevent the loading down of any one of the impedance-responsive circuits by the remainder. Whenever a rip or tear occurs along the cable 10 at the position of one of the detecting channels, its associated detector circuit provides a low voltage to the diodes 75, 96, or 97, and the coil 72 is energized to pull the armature 76 to its lowermost position to activate the alarm bell 30. An operator may determine which of the detecting channels has the leak by observing a panel of pilot lights similar to the lamp 31 associated with each one of the alarm circuits.

Component values of the detector circuit 25 found satisfactory in a working embodiment of the invention are given by the following table:

*Component values of the detector circuit*

| | |
|---|---|
| Resistor 50 | 20K ohms. |
| Resistor 51 | 1000 ohms. |
| Resistor 62 | 5000 ohms. |
| Resistor 65 | 20K ohms. |
| Resistor 66 | 5.6K ohms. |
| Resistor 68 | 470 ohms. |
| Resistor 70 | 75 ohms. |
| Resistor 90 | 6.2K ohms. |
| Capacitor 92 | 4.7 microfarads. |
| Transistor 48 | Type 2N1304. |
| Transistor 52 | Type 2N2925. |
| Transistor 54 | Type 2N2925. |
| Transistor 56 | Type 2N1925. |
| Diode 80 | Type 1N463. |
| Diodes 75, 96, and 97 | Type 1N4003. |
| Zener diode 52 | Type 1N963B. |
| Relay 74 | Sigma No. 33RJK–800 VG SIL. |
| Lamp 31 | General Electric No. 330. |

In practicing the present invention, it has been found desirable that only a low voltage, on the order of 1.2 volts, be put on the conductors 19 while sensing for leakage in the cable 10. If a high voltage is used on the conductors 19, a large switching transient is caused in the recording system when the relay coil 39 is energized to disconnect the detector circuit 25 and connect the recording circuit. A large switching transient is undesirable because it interferes with the recorded seismic energy.

In addition to the fact that the present invention provides an alarm signal to the operator when extensive tears or rips occur in the seismic cable, it also senses small leaks which would ordinarily cause a noisy recording channel. Very small holes that occur in the cable admit a small amount of salt water which the detector circuit of the present invention may sense to give an alarm condition.

Now that the invention has been completely described and illustrated, it will become apparent to those skilled in the art that certain modifications can be made. It is intended to cover all such modifications as fall within the scope of the appended claims.

The invention claimed is:

1. In seismic exploration, the method of detecting the ripping or tearing of a marine seismic cable which is being towed by a boat and which includes electrical conductors within a normally watertight outer sheath, said method comprising the steps of:
    (a) applying a voltage between at least one of said conductors and a grounding point in the water,
    (b) sensing for the flow of electric current from said conductors via the water to said grounding point, and
    (c) providing an alarm indication of the ripping or tearing of said outer sheath when the sensed electric current exceeds a predetermined threshold level.

2. In marine seismic exploration wherein seismic energy is repetitively generated in the water and the resulting seismic waves are detected at detectors spaced along a cable being towed by a boat, said detectors being connected by way of electrical conductors in said cable to equipment on board the boat for recording the detected seismic waves, said conductors being enclosed within a normally watertight outer sheath, the improvement comprising:
    (a) sensing only during the time when seismic waves are not being recorded, the impedance between said conductors and the water, and
    (b) providing an alarm indication of excessive ground leakage when a break occurs in said outer sheath to admit water and the sensed impedance drops below a minimum level.

3. A method as in claim 2 wherein step (a) includes:
    (1) applying a regulated voltage between at least one of said conductors and a grounding point in the water only during the time when seismic waves are not being recorded, and
    (2) sensing during said time the electric current flowing from said conductors via the water to said grounding point.

4. A method as in claim 3 wherein step (1) includes applying a direct current voltage.

5. In a marine seismic exploration system wherein seismic energy is repetitively generated in the water and the resulting seismic waves are detected at at least one detector station located along a cable being towed by a boat, said detector station being connected by way of electrical conductors in said cable to equipment on board the boat for recording the detected seismic waves, apparatus for detecting the ripping or tearing of said cable comprising:
    (a) an input terminal for connection to at least one of said conductors,
    (b) a ground terminal for connection to a grounding point on the hull of the boat,
    (c) a first resistor connected across said input and ground terminals,
    (d) a source of regulated voltage,
    (e) a second resistor having one end connected to said input terminal and the other end connected to said source of regulated voltage, (f) transistorized circuitry coupled to said input terminal and said grounding terminal for producing an alarm signal at an output terminal when sufficient leakage current flows from said conductors via the water to said grounding terminal to cause a decrease in voltage across said first resistor below a predetermined minimum level, and (g) alarm indicating means for connection to said output terminal and responsive to said alarm signal for giving an alarm indication before extensive ripping or tearing occurs in the cable.

6. Apparatus as in claim 5 wherein said source of regulated voltage includes a source of regulated direct current voltage.

7. Apparatus as in claim 5 wherein said transistorized circuitry includes:

(a) a source of bias voltage,
(b) a first transistor stage including a transistor with a base, an emitter and a collector, said base being coupled to said input, said collector being coupled to said source of bias voltage, and a diode connected in circuit between said emitter and said ground terminal, said first stage being normally in one state of conduction,
(c) a second transistor stage coupled to the output of said first stage and being normally in a state of conduction opposite to said first stage, and
(d) an impedance-matching transistor stage coupled to the output of said second stage for producing said alarm signal at said output terminal.

8. Apparatus as in claim 5 wherein said source of regulated voltage includes:

(a) a source of bias voltage,
(b) a transistor with a base, a collector and an emitter, said emitter being coupled to said other end of said second resistor, said collector being coupled to said source of bias voltage,
(c) a third resistor coupled between said base and said source of bias voltage, and
(d) a Zener diode coupled between said base and said ground terminal.

9. Apparatus as in claim 5 including relay means under operational control of said recording equipment for disconnecting said input terminal from said conductors during the time of recording seismic waves.

10. In a marine seismic exploration system wherein seismic energy is repetitively generated in the water and the resulting seismic waves are detected at at least one detector station located along a cable being towed by a boat, said detector station being connected by way of electrical conductors in said cable to equipment on board the boat for recording the detected seismic waves, the improvement for detecting the ripping or tearing of said cable comprising:

(a) a detector circuit having an input terminal for connection to at least one of said conductors and a ground terminal for connection to a grounding point on the hull of the boat, said detector circuit including
a first resistor connected across said input and ground terminals,
a source of regulated direct current voltage,
a second resistor having one end connected to said input terminal and the other end connected to said source of regulated voltage, and
circuitry coupled to said input terminal and said grounding terminal for producing an alarm signal at an output terminal when sufficient leakage current flows from said conductors via the water to said grounding terminal to cause a decrease in voltage across said first resistor below a predetermined minimum level, (b) relay means under operational control of said recording equipment for disconnecting said input terminal of said detector circuit from said conductors during the time of recording seismic waves, and (c) alarm indicating means for connection to said output terminal and responsive to said alarm signal for giving an alarm indication before extensive ripping or tearing occurs in the cable.

11. Apparatus for monitoring the condition of a marine seismic detector cable which is towed behind a boat and which includes a normally watertight outer sheath, comprising:

(a) a voltage source located on the boat,
(b) a first electrode located within said outer sheath,
(c) a first conductor extending from said first electrode along inside said cable to one terminal of said voltage source,
(d) a second electrode formed by the hull of said boat,
(e) a second conductor connected between said second electrode and the other terminal of said voltage source, and
(f) indicating means in circuit with said two electrodes for giving an indication when a break occurs in said outer sheath to admit water and the electric current flowing between said two electrodes exceeds a predetermined threshold level.

12. Apparatus as in claim 11 wherein said first conductor is used for transmission of detected seismic waves to recording equipment on said boat and including relay means under operational control of said recording equipment for disconnecting said voltage source from the circuit between said electrodes during the time of recording seismic waves.

13. Apparatus as in claim 11 including a plurality of first electrodes spaced longitudinally within said detector cable.

14. Apparatus as in claim 13 including a plurality of said indicating means individually connected in circuit between said second electrode and separate ones of said first electrodes, each of said indicating means giving a unique indication signal for leakage current.

References Cited

UNITED STATES PATENTS

| | | | |
|---|---|---|---|
| 367,422 | 8/1887 | Mellett | 340—4 |
| 1,197,366 | 9/1916 | Hahnemann | 340—4 |
| 2,465,696 | 3/1949 | Paslay | 181—.5 |

BENJAMIN A. BORCHELT, *Primary Examiner.*

P. A. SHANLEY, *Assistant Examiner.*